Sept. 23, 1969     B. G. GARDNER ET AL     3,468,405
SELF-ADJUSTING CLUTCH ASSEMBLY
Filed May 5, 1967
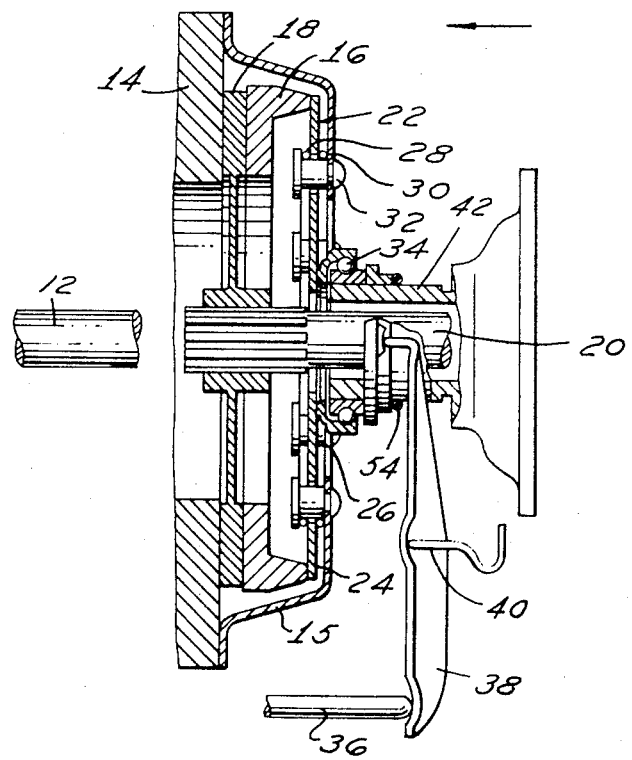
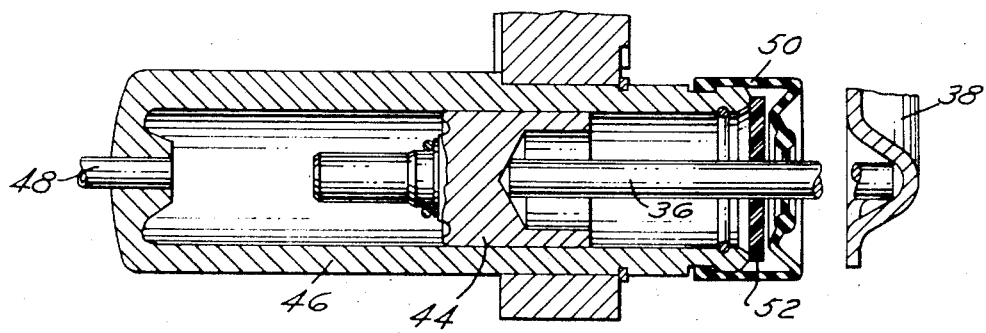
BRIAN G. GARDNER
DAVID J. RUNCHMAN
INVENTORS
BY John R. Faulkner
Clifford L. Sadler
ATTORNEYS

United States Patent Office 3,468,405
Patented Sept. 23, 1969

3,468,405
SELF-ADJUSTING CLUTCH ASSEMBLY
Brian George Gardner, Rayleigh, and David John Runchman, Leigh-on-Sea, England, assignors to Ford Motor Company, Dearborn, Mich., a corporation of Delaware
Filed May 5, 1967, Ser. No. 636,314
Int. Cl. F16d 11/00, 13/60, 65/38
U.S. Cl. 192—111                                    3 Claims

ABSTRACT OF THE DISCLOSURE

A clutch assembly having a frictionally retained release bearing stop member that limits the travel of the release bearing upon clutch engagement and that moves relative to its support member as the increased displacement of the release bearing caused by clutch disc wear overcomes its frictional resistance, thus effecting automatic adjustment of the clutch.

---

This invention relates to self-adjusting friction clutches.

BACKGROUND OF THE INVENTION

The friction members of a friction clutch experience progressive wear during the course of normal operation. As a result of this wear, the positions of the clutch release bearing at which it effects clutch engagement and clutch disengagement are continually changing. In one type of conventional hydraulically operated friction clutch, accommodation is made for this progression of wear by employing a release bearing stop positioned with a small amount of clearance past the clutch engagement position. After the wear of the friction members has used up this clearance, the stop is manually repositioned to again provide a small amount of clearance. The major disadvantages of this system are the need for periodic manual adjustment and, secondly, the undesirable free play permitted in the release mechanism as a result of the necessary clearance between the engaged position and the stop position.

To overcome these disadvantages, a spring in the hydraulic actuating cylinder or slave cylinder is often used to keep the release linkage continuously compressed. Such a spring keeps free play out of the release mechanism and provides automatic adjustment, but it also leads to rapid wear between the rotating diaphragm spring fingers and the clutch release bearing. Due to manufacturing tolerances the diaphragm spring, centered about the input shaft axis, and the release bearing, centered about the bearing support member axis, are generally slightly non-axial causing a continuous rubbing action. This rubbing action causes wear and eventual failure of the diaphragm spring. For this reason it is desirable to reduce the pressure between the diaphragm spring fingers and the release bearing as much as possible, but yet providing a positive stop to keep free play out of the linkage system.

BRIEF SUMMARY OF THE INVENTION

The present invention provides a self-adjusting friction clutch that has a frictionally retained, movable release bearing stop.

It is an object of this invention to provide a self-adjusting friction clutch assembly that eliminates free play from the clutch release mechanism during clutch engagement, but yet does not provide a stiff spring force to cause rapid wear between the diaphragm spring and the clutch release bearing. Only a slight frictional force between the stop member of this invention and its suport member will keep the undesirable free play or lost motion out of the clutch release mechanism.

It is also an object of this invention to provide a clutch assembly that is economical to manufacture, dependable in operation and easy to maintain and service.

More specifically, it is an object of this invention to provide a clutch assembly including a clutch release lever, a release bearing having a surface constructed to engage and move axially with the clutch release lever, and a stop means frictionally secured to a support member limiting the movement of said release bearing upon clutch engagement, the stop means being displaceable with respect to its support member as the incrementally-increasing displacement of the release bearing resulting from wear of the clutch disc drives the frictionally retained stop means along its support member upon successive clutch engagements.

Other objects, features and advantages of the invention will become apparent upon reference to the following detailed description and to the accompanying drawing.

BRIEF DESCRIPTION OF THE DRAWINGS

FIGURE 1 is a sectional view through a clutch constructed according to the invention; and
FIGURE 2 is a section through the slave cylinder of the clutch of FIGURE 1.

DETAILED DESCRIPTION OF THE INVENTION

The clutch mechanism shown in FIGURE 1 comprises an input shaft 12 which is connected to a flywheel 14. The clutch includes the usual clutch cover 15 and pressure plate 16. These elements constitute the input members of the clutch assembly. Clutch disc 18 is splined to an output shaft 20 and has its outer periphery located between the pressure plate 16 and flywheel 14. Diaphragm spring 22, coaxial with output shaft 20, has its outer periphery abutting against pressure plate 16 to normally urge plate 16 towards flywheel 14 and thus clamp clutch disc 18 between them so that torque can be transmitted from input shaft 12 to output shaft 20 through clutch disc 18.

Diaphragm spring 22 comprises an outer annular portion 24 and a plurality of radially inwardly extending fingers 26. A pair of spaced apart rings 28 and 30 carried by studs 32 mounted on cover 15 form a fulcrum member for the diaphragm spring. Rings 28 and 30 engage the diaphragm spring at the area where the radially outer ends of fingers 26 join annular portion 24 of spring 22. The radially inner ends of fingers 26 are movable in the direction of the arrow in FIGURE 1 by clutch release bearing 34 which is coaxial with output shaft 20 and movable axially with respect to it. In order to disengage the clutch, bearing 34 is moved to the left by push rod 36 that operates through clutch release fork 38 which pivots about fixed pivot 40. Bearing 34 is guided by fixed support sleeve 42 through which output shaft 20 extends. This movement of bearing 34 results in the outer periphery of annular portions 24 moving in the opposite axial direction indicated to thus relieve the pressure on input member 16.

Fork 38 does not rotate but the diaphragm spring does rotate. This relative movement is provided for by release bearing 34, one race of which rotates and the other of which is stationary.

Push rod 36 is operated through a hydraulic piston and cylinder assembly shown in FIGURE 2. The driver operated master cylinder which supplies fluid under pressure to operate the slave cylinder shown in FIGURE 2 is not shown.

This fluid is supplied to the left-hand side of piston 44 in cylinder 46 through inlet 48. The right-hand side of the piston is cup shaped to receive push rod 36. Rubber boot 50 closes the right-hand end of the cylinder to keep out dirt and water. The small end of boot 50 is secured to push rod 36 and moves with the push rod. Within boot 50 stop washer 52 is mounted on and frictionally retained by push rod 36. The stop is preferably annular in shape and of nylon fabrication. When the clutch is engaged, stop 52 abuts against the right hand end of cylinder 46.

As the clutch is used, the thickness of disc 18 wears down. After a certain amount of wear the clutch release linkage, if it were not adjustable, would prevent the clutch from being completely engaged.

In this invention, adjustability is provided automatically by stop washer 52 which is held by friction. When the clutch is assembled washer 52 is held against the end of cylinder 46 while push rod 36 is moved away from piston 44 to take up all the free play in the linkage between push rod 36 and fingers 26 of the diaphragm spring 22. Stop washer 52 then prevents small external forces on the linkage—for example, due to the vehicle traveling along an uneven road—from allowing the push rod to slide further into cylinder 46 to create lost motion in the linkage. If stop washer 52 were completely fixed, as soon as the clutch disc had worn slightly the stop would prevent the linkage from following this wear and thus would make it impossible to engage the clutch. Instead, the light friction grip of stop washer 52 permits push rod 36 to slide through washer 52 as the clutch wears and thus allows the clutch adjustment to follow the wear of clutch disc 18.

The only time that manual adjustment is required is when the clutch is dismantled and this adjustment simply requires the push rod 36 to be pulled in a direction out from the cylinder while the stop washer 52 is held against the end of the cylinder.

When the clutch is disengaged, the stop washer 52 moves to the right; rubber boot 50 is shaped to accommodate this movement.

A frictionally retained stop may be positioned in some other part of the linkage besides push rod 36. One other possibility is shown in FIGURE 1. Here the friction device is ring stop 54 which grips sleeve 42 and provides frictional resistance to movement of thrust bearing 34 away from fingers 26 of diaphragm spring 22.

Where the only significant external forces act on bearing 34, stop ring 54 would be a suitable friction stop.

It should be understood that the two friction stops 52 and 54 would not both be used in the same linkage; they are shown on the drawings of a single clutch linkage merely for convenience of explanation.

The foregoing description constitutes the presently preferred embodiments of the invention. Modifications and alterations may occur to those skilled in the art which will come within the scope and spirit of the following claims.

What is claimed is:
1. A clutch assembly having a cover,
a pressure plate movably connected to said cover,
a clutch disc constructed to be engaged by said pressure plate,
release means connected to said cover and said pressure plate,
release bearing means having a surface constructed to engage said release means and to move axially therewith,
a bearing support member slidably supporting said release bearing means,
resilient stop means having a generally annular shape, the radial inner periphery of said stop means frictionally engaging said support member, a radial side surface of said stop means abutting said release bearing means upon clutch engagement,
said stop means holding said release bearing means and said release means in contact during clutch engagement,
said stop means being fixed in position relative to said support member during clutch disengagement and being substantially fixed in position relative to said support member during clutch engagement,
said stop means being axially displaceable incrementally with respect to said bearing support member as the incrementally increasing displacement of said release bearing means resulting from wear of said clutch disc drives the stop means along said bearing support member upon successive clutch engagements.

2. A clutch assembly according to claim 1 and including:
said release bearing means being axially movable relative to said support member.

3. A friction clutch assembly having driving and driven members,
one of said members being axially movable to engage the other of said members,
means constructed to move one of said members axially to engage and disengage said other member,
said means including a movable element and a fixed supporting element,
stop means formed of resilient material frictionally engaging one of said elements and constructed to limit the movement of said movable element relative to said fixed supporting element,
said stop means being fixed in position relative to said one element during clutch disengagement and being substantially fixed in position relative to said one element during clutch engagement,
said stop means being displaceable incrementally relative to said one element as the incrementally increasing displacement of said movable element resulting from wear of said clutch assembly members drives the frictionally retained stop means upon successive clutch engagements along said one element.
said stop means abutting the other of said elements when said members are in mutual engagement and being entirely spaced apart from said other element when said members are disengaged.

References Cited

UNITED STATES PATENTS

| | | |
|---|---|---|
| 1,968,274 | 7/1934 | Wemp. |
| 2,501,005 | 3/1950 | Rockwell. |
| 2,885,049 | 5/1959 | Staadt. |
| 3,255,846 | 6/1966 | Livezey. |
| 3,286,803 | 11/1966 | Zeidler. |
| 3,277,983 | 10/1966 | Jeffries. |
| 3,377,076 | 4/1968 | Burnett. |
| 3,186,521 | 6/1965 | Chovings. |

FOREIGN PATENTS 1,027,925   4/1966   Great Britain.

BENJAMIN W. WYCHE III, Primary Examiner

U.S. Cl. X.R.

188—196; 192—91